(12) United States Patent
Sokolov et al.

(10) Patent No.: US 9,154,377 B1
(45) Date of Patent: Oct. 6, 2015

(54) SYSTEMS AND METHODS FOR MANAGING DEVICES ACROSS DISCONNECTED ENVIRONMENTS

(71) Applicant: Symantec Corporation, Mountain View, CA (US)

(72) Inventors: Maksim Sokolov, Tallinn (EE); Cody Menard, Houston, TX (US)

(73) Assignee: Symantec Corporation, Mountain View, CA (US)

( * ) Notice: Subject to any disclaimer, the term of this patent is extended or adjusted under 35 U.S.C. 154(b) by 290 days.

(21) Appl. No.: 13/777,893

(22) Filed: Feb. 26, 2013

(51) Int. Cl.
*G06F 15/16* (2006.01)
*H04L 12/24* (2006.01)

(52) U.S. Cl.
CPC ................... *H04L 41/0813* (2013.01)

(58) Field of Classification Search
CPC ....................... H04L 29/08972; G06F 21/6218
USPC .......................................................... 709/219
See application file for complete search history.

(56) References Cited

U.S. PATENT DOCUMENTS

| | | | | |
|---|---|---|---|---|
| 8,490,163 | B1* | 7/2013 | Harsell et al. | 726/6 |
| 2003/0115484 | A1* | 6/2003 | Moriconi et al. | 713/201 |
| 2008/0104661 | A1* | 5/2008 | Levin et al. | 726/1 |
| 2009/0288168 | A1* | 11/2009 | Maghsoodnia et al. | 726/24 |
| 2011/0209196 | A1* | 8/2011 | Kennedy | 726/1 |
| 2012/0042074 | A1* | 2/2012 | Fang et al. | 709/225 |
| 2012/0309447 | A1* | 12/2012 | Mustajarvi et al. | 455/524 |

OTHER PUBLICATIONS

Citrix Product Documentation, Managing Roaming User Profiles, available on http://support.citrix.com/proddocs/topic/provisioning-61/pvs-network-profiles-roaming-manage.html, as early as Apr. 2014.
DMTF, Management Profiles, available on http://dmtf.org/standards/profiles, as early as Apr. 2014.

* cited by examiner

*Primary Examiner* — Tauqir Hussain
(74) *Attorney, Agent, or Firm* — Holland & Hart, LLP

(57) ABSTRACT

A computer-implemented method to manage a device is described. Communications with an endpoint device are established. A management profile for the endpoint device is received. Information about the endpoint device is acquired based at least in part on the management profile. At least a portion of the acquired information is provided to an upper layer server.

16 Claims, 12 Drawing Sheets

SYSTEMS AND METHODS FOR MANAGING DEVICES ACROSS DISCONNECTED ENVIRONMENTS

BACKGROUND

The use of computer devices and computer-related technologies continues to increase at a rapid pace. This increased use of computer devices has influenced the advances made to computer-related technologies. Indeed, computer devices have increasingly become an integral part of the business world and the activities of individual consumers. Computer devices may be used to carry out several business, industry, and academic endeavors. The wide-spread use of these devices has been accelerated by the increased use of communication networks, and computer networks, including the Internet.

Many businesses and individuals use one or more communication and/or computer networks to communicate and share data between the various devices connected to the networks. Often portions of these networks are sectioned into network environments that are managed to help protect the various devices and resources that are connected to the network environment. The widespread use of computer devices and increased mobility of computer devices serves to increase the need for computing devices to connect to different network environments. However, traveling between different network environments and connecting with the different network environments may be cumbersome and possibly problematic.

SUMMARY

According to at least one embodiment, a computer-implemented method to manage a device is described. Communication with an endpoint device is established. A management profile for the endpoint device is received. Information about the endpoint device is acquired based at least in part on the management profile. At least a portion of the acquired information is provided to an upper layer server.

In one embodiment, the management profile for the endpoint device is generated in a first environment. The first environment may be managed by a first management server and the first environment may have a first set of management policies.

In some cases, the portion of the acquired information may correspond to endpoint device information that is provided to the upper layer server by the first management server. The portion of the acquired information may identify the endpoint device as the same endpoint device that is associated with the endpoint device information, without duplication of one or more of data, compliance level, and/or status information.

In some configurations, the endpoint device may be managed based at least in part on the information about the endpoint device. Managing the endpoint device may include comparing the management profile with a second set of management policies for a second environment. The second environment may be managed by a second management server. Managing the endpoint device may also include updating the endpoint device based at least in part on the second set of management policies. Managing the endpoint device may further include communicating with the endpoint device to update the management profile. The updated management profile may include first information related to the first set of management policies and second information related to the second set of management policies. The first information may enable continuity of management with the first management server in the first environment, and the second information may enable continuity of management with the second management server in the second environment.

In some cases, updating the endpoint device includes pushing management data to the endpoint device. The management data may be a policy, a software update, a software patch, a software deployment package, an antivirus definition, a firmware update, and/or a system update.

The first environment and the second environment may be disconnected environments. The management profile may uniquely identify an identity of the endpoint device and/or a management posture of the endpoint device. The management profile may enable the endpoint device to be uniquely identified to the first management server and the second management server.

In one embodiment, the management profile may be represented in a universal format that is usable by the first management server and the second management server. In some cases, the first management server and the second management server may use software from different vendors.

In some configurations, the management profile may include device information, security information, inventory information, current management state information, information related to current policies, information related to supported capabilities, and/or information related to a last applied set of management rules. The management profile may be stored on the endpoint device.

A device configured to manage a device may also be described. The device may include a processor and memory in electronic communication with the processor. The device may further include instructions stored in the memory. The instructions may be executable by the processor to communicate with an endpoint device, receive a management profile for the endpoint device, acquire information about the endpoint device based at least in part on the management profile, and provide at least a portion of the acquired information to an upper layer server.

A computer-program product to manage a device may also be described. The computer-program product may include a non-transitory computer-readable medium having instructions thereon. The instructions may be executable by a processor to communicate with an endpoint device, receive a management profile for the endpoint device, acquire information about the endpoint device based at least in part on the management profile, and provide at least a portion of the acquired information to an upper layer server.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
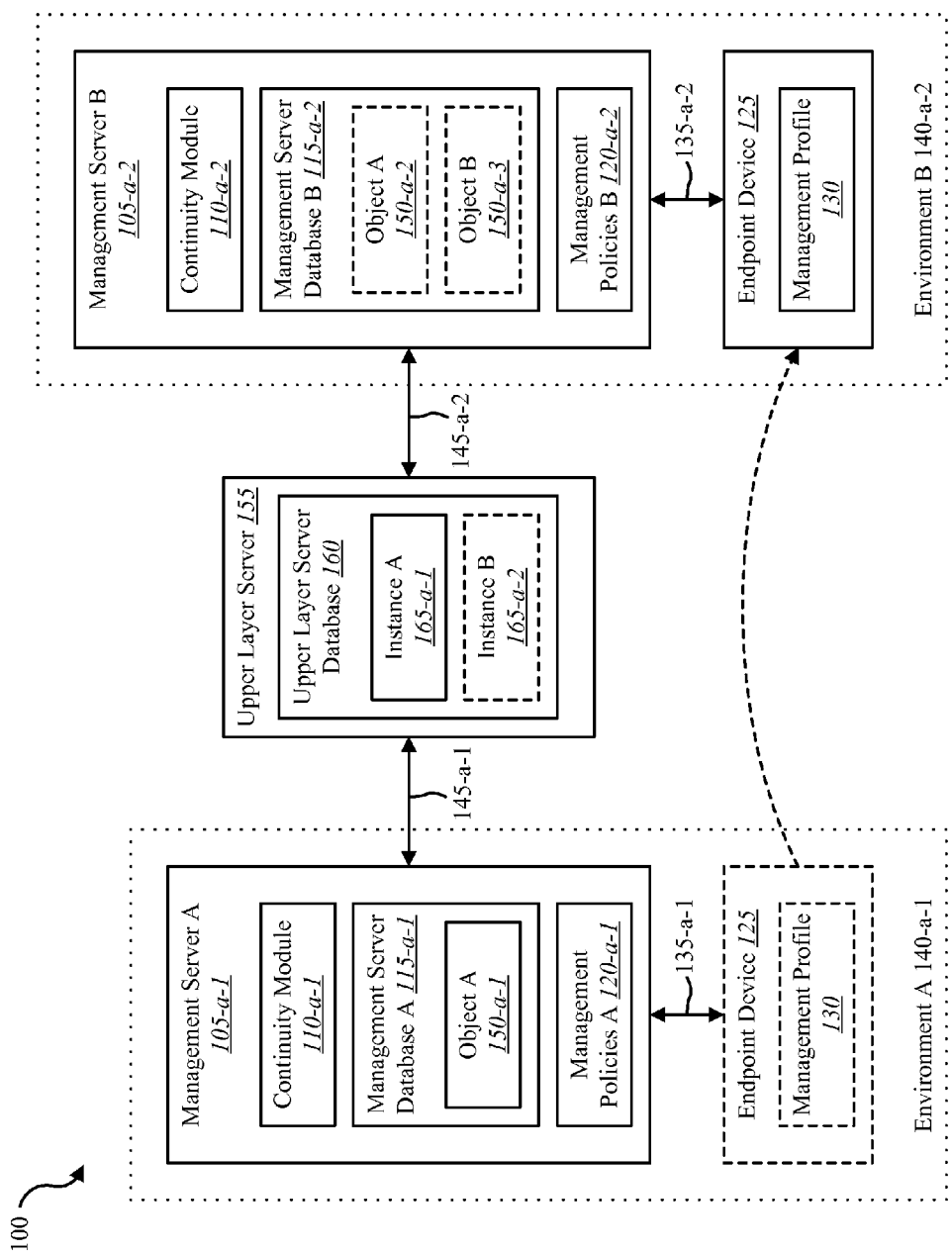
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Often it is desirable to manage an endpoint device within an environment. For example, in an enterprise environment, it may be desirable to ensure that an endpoint device is compliant with a set of policies before allowing the endpoint device to operate in the enterprise environment. In the typical scenario, an environment includes a management server and one or more endpoint devices (that are managed by the management server). In one example, the management server communicates with an endpoint device to determine if the endpoint device is compliant with the required set of management policies. If the endpoint device is not compliant with the required set of management policies, then the management server may quarantine the endpoint device until the endpoint device is compliant with the required management policies. In some cases, the management server may push management data (e.g., policies, patches, etc.) to the endpoint device so that the endpoint device will become compliant with the required set of management policies. The management server may keep a database that stores information about the endpoint device. In one example, the management server may create a management object for each endpoint device that it is managing. The object may include an identifier for the endpoint device.

In various scenarios, an endpoint device may travel from a first managed environment to a second managed environment. For example, the endpoint device may travel from an environment governed by a first management server to an environment managed by a second (different) management server. Even in the case where the first management server and the second management server are part of the same enterprise, the first management server and the second management server may operate independently from each other (disconnected environments, for example). Continuing with the previous example, the first management server may include an object (with an identifier) in its database for the endpoint device.

Currently, when the endpoint device communicates with the second management server, the second management server will treat the endpoint device as a new resource. Accordingly, the second management server may create an object (with a new identifier) in its database. Even though the object in the first management server database and the object in the second management server database are for the same endpoint device, they may include different identifiers. If the first management server database and the second management server database are audited by an upper layer server, then the upper layer server may view the different identifiers as different endpoint devices instead of different instances of the same endpoint device. This discrepancy may be undesirable. For instance, if the number of needed software licenses is determined based on the audit by the upper layer server, then the same endpoint device may be allotted two software licenses where only one was needed.

In some cases, the systems and methods described herein may be used to continuously manage an endpoint device across disconnected environments. In one embodiment, a management profile may be created for an endpoint device. For example, the management profile may be generated while the endpoint device is in the first environment. The management profile may include all related device and user policies, configuration items, management and compliance levels, and other characteristics that define an endpoint current security and management posture. The management profile may be represented (using well defined standards and interfaces, for example) in a format that is usable by other management servers. Therefore, when an endpoint device travels from a first managed environment to a second managed environment, the second management server may use the management profile to identify and manage the endpoint device. The management profile may allow the second management server to use the same identifier when creating an object in the second management server database for the endpoint device. Thus, the identifier of the object in the second management server database may correspond to the identifier for the object in the first management server database in a manner that an upper layer may recognize the database entries as different instances of the same endpoint device (because the both objects uniquely identify the same endpoint device, for example). Furthermore, the management profile may enable the endpoint device to seamlessly travel between disconnected environments without reinstalling management data associated with each environment.

In one example, the management profile is securely stored and updated every time any management action is taking place (new software being rolled out, inventory scan schedule get modified, the power saving settings got updated and so on). This may allow the latest information to be provided to another environment upon joining it after the migration/transfer from the old environment. Updating the management profile every time any management action is taking place may also serve to facilitate local journaling and auditing purposes at the endpoint. When the endpoint device travels to a new environment, the management server may use the management profile to discover the unique identity (e.g., its unique footprint) of the endpoint and establish and update the endpoint's management posture relative to the security and compliance management policies and requirements specified by the environments administrators. It may be noted that whenever there is any conflict or gap between the management profile and the management configuration of the new management server regarding, for instance, a policy or patch levels, the new management server may (temporarily, for example) override one or more previous management configurations (or a portion thereof). In case the endpoint travels back to the previous environment, the endpoint device may recall and submit the related management profile or a portion of the management profile (using some form of versioning, for example).

Turning now to the Figures, FIG. 1 is a block diagram 100 illustrating one embodiment of an environment in which the present systems and methods may be implemented. In one embodiment an upper layer server 155 may communicate with management server A 105-a-1 in environment A 140-a-1 and management server B 105-a-2 in environment B 140-a-2. Management server A 105-a-1 may manage one or more endpoint devices (e.g., endpoint device 125) in environment A 140-a-1 and management server B 105-a-1 may manage one or more endpoint device (e.g., endpoint device 125) in environment B 140-a-2. Management server A 105-a-1 and management server B 105-a-2 may each operate independently. Therefore, environment A 140-a-1 and environment B 140-a-2 may be disconnected environments.

In general, a management server (e.g., management server A 105-a-1, management server B 105-b) may communicate with an endpoint device 125 via a connection (e.g., connection 135-a-1, connection 135-a-2). Connections 135 may be a local area networks (LAN), a wide area networks (WAN), and/or a personal area networks (PAN). In one example, the connection 135 may be an intranet. Each management server may include a continuity module (e.g., continuity module 110-a-1, continuity module 110-a-2), a management server database (e.g., management server database A 115-a-1, management server database B 115-a-1), and a set of management policies (e.g., management policies A 120-a-1, management policies B 120-a-2). In some configurations, a management server may communicate with an upper layer server 155 via a connection (e.g., connection 145-a-1, connection 145-a-2). Connection 145 may be an example of connection 135. In one example, connection 145 may be the Internet. In some cases, the upper layer server 155 may communicate with a management server for auditing purposes.

Generally speaking, the continuity module may receive a management profile 130 associated with an endpoint device 125 (the management profile 130 may be stored on the endpoint device 125, for example). The continuity module may analyze the management profile 130 and may determine information about the endpoint device 125. The continuity module may generate a management object (e.g., object A 150-a-1, object A 150-a-2, object B 150-a-3) for the endpoint device, which may be stored in the management server database. The continuity module may ensure that the endpoint device 125 is compliant with the set of management policies and may update (if necessary) the endpoint device 125 so that it may become compliant. The management profile 130 may also be updated with any management actions that were taken and to indicate that the endpoint device is managed by the managed server. Details regarding the continuity module 110 are described below.

In one example, the endpoint device 125 may enter environment A 140-a-1. Management server A 105-a-1 may discover the endpoint device 125 and the continuity module 110-a-1 may determine if the endpoint device 125 includes a management profile 130. If the endpoint device 125 does not include a management profile 130, then the continuity module 110-a-1 may communicate with the endpoint device 125 and generate a management profile 130. If the endpoint device 125 does not include a management profile 130, then object A 150-a-1 may be created based on information that was determined about the endpoint device 125. Otherwise, object A 150-a-1 may be generated based on information acquired from the management profile 130.

In this example, the endpoint device 125 may travel from environment A 140-a-1 to environment B 140-a-2. When the endpoint device 125 attempts to connect into environment B 140-a-2 it may be discovered by management server B 105-a-2.

Currently (assuming no continuity module 110-a-2), management server B 105-a-2 would view the discovered endpoint device 125 as a new resource and would generate object B 150-a-3 for the endpoint device 125. Object B 150-a-3 may be stored in management server database B 115-a-2. In this scenario, if an upper layer server 155 performs an audit of both management server A 105-a-1 and management server B 105-a-2, then an upper layer server database 160 may include instance A 165-a-1 which corresponds to object A 150-a-1 from management server A 105-a-1 and instance B 165-a-2 which corresponds to object B 150-a-3 from management server B 105-a-2. Thus, in current systems, the upper layer server 155 may include multiple instances for the same endpoint device 125.

In another scenario (using the present systems and methods), the continuity module 110-a-2 would receive the management profile 130 for the endpoint device 125 and acquire information about the endpoint device (including its unique identity, for example) based on the management profile 130. The continuity module 110-a-2 may then generate object A 150-a-2 based on the acquired information. The continuity module 110-a-2 may generate object A 105-a-2 so that it corresponds to object A 105-a-1 that was generated by management server A 105-a-1. Object A 105-a-2 may be stored in management server database B 115-a-2. In this scenario, if an upper layer server 155 performs an audit of both management server A 105-a-1 and management server B 105-a-2, then the upper layer server database 160 may include a single instance A 165-a-1 which corresponds to both object A 150-a-1 from management server A 105-a-1 and object A 150-a-2 from management server B 105-a-2. Thus, the present systems and methods may enable the upper layer server 155 to include a single instance for a single endpoint device 125 (even if the endpoint device travels to multiple managed environments, for example).

Figure 2:
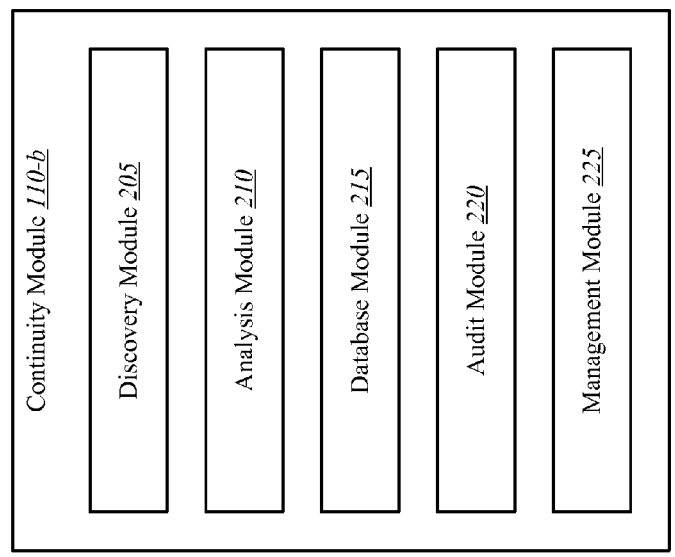
FIG. 2 is a block diagram illustrating one embodiment of a continuity module.

FIG. 2 is a block diagram 200 illustrating one embodiment of a continuity module 110-b. The continuity module 110-b may be an example of the continuity module 110 illustrated in FIG. 1. In one embodiment, the continuity module 110-b may include a discovery module 205, an analysis module 210, a database module 215, an audit module 220, and a management module 225.

The discovery module 205 may discover an endpoint device 125. For example, the discovery module 205 may discover an endpoint device 125 when the endpoint device 125 attempts to connect to the managed environment. Additionally or alternatively, the discovery module 205 may discover whether an endpoint device 125 includes a management profile 130. For example, the discovery module 205 may query an endpoint device 125 to determine if the endpoint device 125 includes a management profile 130. If an endpoint device 125 includes a management profile 130, the discovery module 205 may request that the endpoint device 125 transmit at least a portion of the management profile 130 to the continuity module 110-b. The discovery module 205 may additionally receive the management profile 130 (or a portion thereof) from the endpoint device 125.

The analysis module 210 may analyze the received management profile 130 to acquire information about the endpoint device 125. For example, the analysis module 210 may analyze the management profile to determine if the endpoint has been managed by a recognized environment (an environment within the same enterprise—that may be audited by the same upper layer server, for example). If the analysis module 210 determines that the endpoint has been managed by a recognized environment, then the analysis module 210 may ensure that the management object that will be created for the current environment (management server, for example) corresponds to a management object that was created in the recognized environment (that corresponds to the unique identity of the endpoint device, for example). The analysis module 210 may additionally identify the management data that is already installed on the endpoint device 125, the endpoint device's 125 capabilities, etc. In some configurations, the information acquired by the analysis module 210 may enable for more efficient management by the management module 225. For example, only the management data that is not installed on the endpoint device 125 may be added to the endpoint device 125 (as opposed to clearing previous management data and installing all new management data, for example).

The database module 215 may generate a management object for each endpoint device 125 that is managed by the management server. The database module 215 may store these management objects in the management server database. If a management object has been created for a different environment, then the database module 215 may generate a management object that corresponds to the previously created management object. In one example, the database module 215 may use the same identifiers to identify the management object that were used previously. As this type of information may be included in the management profile 130, the database module 215 may be able to generate a management object that is substantially similar to a management object that was created previously. It may be noted, that if the endpoint 125 had not been managed by a recognized environment, then the database module 215 may elect to generate a management object as if the endpoint device were a new resource (however, the information in the management policy may still be used to manage the endpoint device 125 more efficiently).

The audit module 220 may receive audit requests from an upper layer server 155 and may provide responses to those requests. For example, the audit module 220 may receive a request for a list of identifiers for each endpoint device that it is (or has been) managing. In one example, the audit module 220 may collect and organize the appropriate information from the management server database. The audit module 220 may then transmit the (organized and formatted, for example) information to the upper layer server 155.

The management module 225 may manage each endpoint device 125. For example, the management module 225 may ensure that each endpoint device is compliant with a set of policies for the environment. Details regarding the management module 225 are described below.

Figure 3:
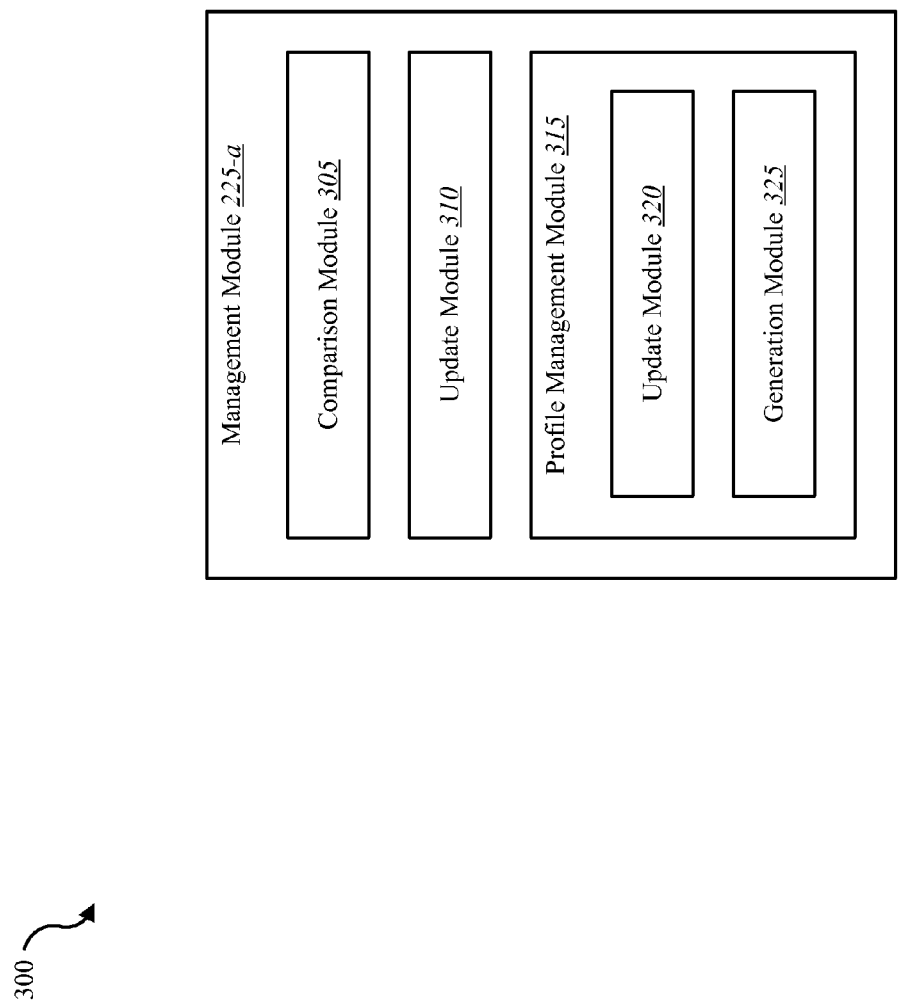
FIG. 3 is a block diagram illustrating one embodiment of a management module.

FIG. 3 is a block diagram 300 illustrating one embodiment of a management module 225-a. The management module 225-a may be an example of the management module 225 illustrated in FIG. 2. The management module 225-a may include a comparison module 305, an update module 310, and a profile management module 315.

The comparison module 305 may obtain a management profile 130 and/or information based on a management profile 130 and may compare the management data that is currently installed on the endpoint device 125 with the set of required management policies. In some cases, the comparison module 305 may also determine if installed management data (e.g., policy) is in an active state or in an inactive state. If the comparison results indicate that the endpoint device 125 is compliant with the required set of management policies (the required set of management data is installed and in an active state, for example), then no updates to the endpoint device may be required. However, if the comparison results indicate that the endpoint device 125 is not compliant with the required set of management policies, then the comparison module 305 may trigger the update module 310 to update the endpoint device 125.

The update module 320 may update the endpoint device 125 based on the results of the comparison with the required set of management policies. In one example, the update module 320 may push or send management data to the endpoint device 125 in accordance with one or more policies. Examples of management data include but are not limited to a policy, a software update, a software patch, a software deployment package, an antivirus definition, a firmware update, a system update, and/or the like. In one example, pushing or sending management data to the endpoint device 125 may update the endpoint device 125 in a way so that the endpoint device 125 is compliant with one or more required management policies. For instance if the required management policy requires that a strict firewall be in place, then pushing management data to the endpoint device 125 may correspond to pushing firewall settings to the endpoint device 125 and providing commands for activating and configuring the firewall. In some cases, the management module 225-a may limit or quarantine the endpoint device 125 until the required management data has been pushed to the endpoint device 125 and the endpoint device is compliant.

The profile management module 315 may generate and/or update a management profile 130 for an endpoint device 125. In one embodiment, the profile management module 315 may include a profile update module 320 and a generation module 325.

The profile update module 320 may update or ensure that the endpoint device 125 updates the management profile 130 when management action takes place on the endpoint device 125. For example, if the update module 310 pushes management data to the endpoint device 125, then the profile update module 320 may ensure that the management profile 130 is updated accordingly. The profile update module 320 may additionally add fields, reorganize, and/or edit a management profile 130. In some cases, the profile update module 320 may change a management profile 130 so that it is represented in a different form (to expand accessibility to management servers using software from different vendors or to limit accessibility to management servers using software from the same vendor, for example).

The generation module 325 may generate a management profile 130 for an endpoint device 125 when the endpoint device 125 does not already include a management profile 130. In one example, the generation module 325 may communicate with the endpoint device 125 to obtain certain information about the device and then may generate the management profile 130 based on information received from the endpoint device 125 and information related to the managed environment. The generation module 325 may transmit the generated management profile 130 to the endpoint device 125 to be stored on the endpoint device 125. In another example, the generation module 325 may provide information and/or instructions to the endpoint device 125 so that the endpoint device 125 may generate (or update) the management profile 130.

Figure 4:
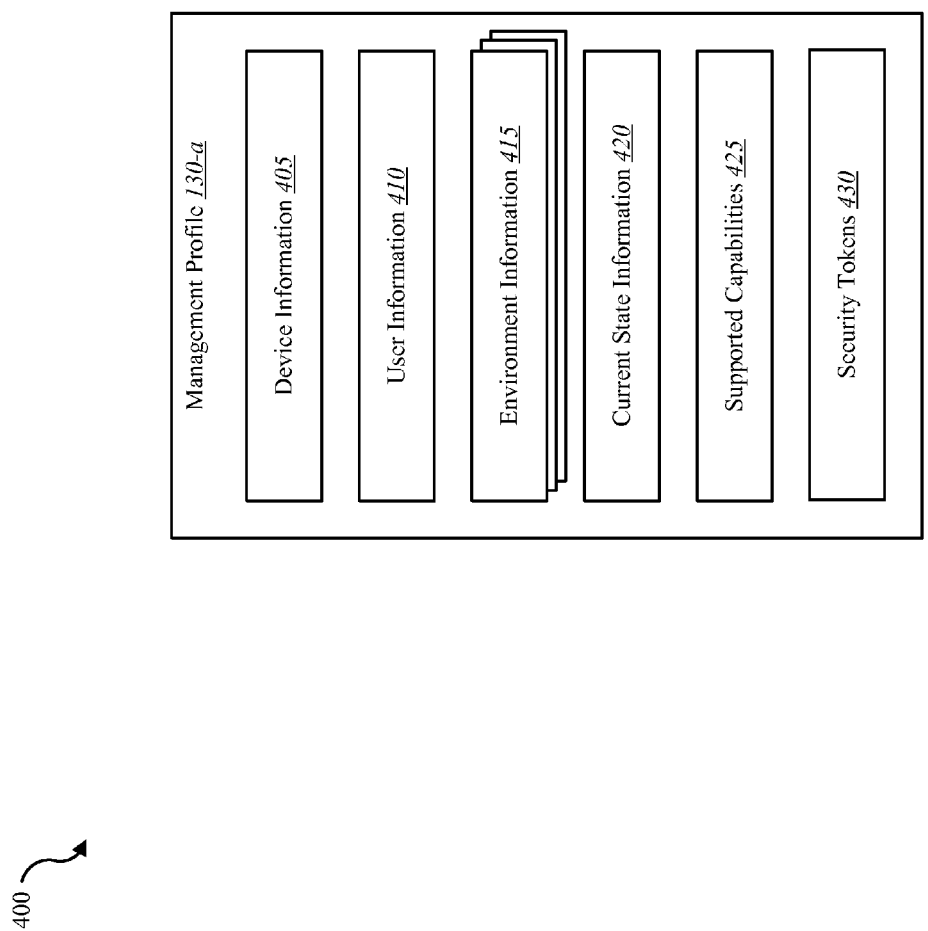
FIG. 4 is a block diagram illustrating one embodiment of a management profile.

FIG. 4 is a block diagram 400 illustrating one embodiment of a management profile 130-a. The management profile 130-a may be an example of the management profile 130 illustrated in FIG. 1. The management profile 130-a may include device information 405, user information 410, environment information 415, current state information 420, supported capabilities 425, and/or security tokens 430.

The management profile may include information that is specific to a particular endpoint device (that uniquely identifies the endpoint device, for example). Device information 405 may include information about the specific hardware configuration of the device, software that is installed on the device, firmware versions, drivers installed, patches installed, operating system information, etc. When there is a defined relationship between the endpoint device and a defined user, the management profile may also include related user information 410 (e.g., user profile elements, user attributes, permissions, etc.). In some cases, the management profile 130-a may include environment information 415 for each managed environment that the endpoint device 125 has been managed in. In some cases, this environment information 415 may allow an endpoint device 125 to recall and activate (or deactivate) various policies based on the managed environment that the endpoint device 125 is entering (or in).

The management profile 130-a may also include current state information 420. For example, the management profile may include information about the current management state of the endpoint device 125 (OS, application patches installed, results of the last hardware and/or software inventory scan, licensing compliance, etc.) and/or information about management rules (tasks and policies, the frequency and conditions to run/update them, management configuration settings, etc.) that were applied to the endpoint at the last (recognized, for example) management infrastructure (managed environment). The management profile 130-a may additionally include information related to supported capabilities 425 of the endpoint device 125 (e.g., being provisioned for Intel® vPro Remote Management, supports WS-MAN protocol, has DRAC card installed and configured, be discoverable via SNMP, etc.). The management profile may optionally include security tokens 430 (public/private key pair, for example) and other user claims that are unique to this endpoint. In one example, information from the management profile 130-a may be used to uniquely identify (e.g., provide a unique footprint of) the endpoint device 125.

The management profile 130-a may be represented in a format (Extensible Markup Language (XML), for example) that is accessible to any management server. In some cases, this may allow the endpoint device to be continuously managed by management servers that are using software from different vendors (e.g., Altiris, Microsoft). It is noted that the auditing process by the upper layer server 155 may allow for auditing across a management servers that are based on different software versions or software from different vendors. For instance, the first management server may be an Altiris management server and the second management server may be a Microsoft management server. Alternatively, the management profile 130-a may be formatted in a way so that it is only accessible by a certain set of management servers (e.g., Altiris management servers, for example).

FIGS. 5-8 illustrate an example of a scenario where an endpoint device is managed by a first managed environment and then travels to a second managed environment according to the present systems and methods.

Figure 5:
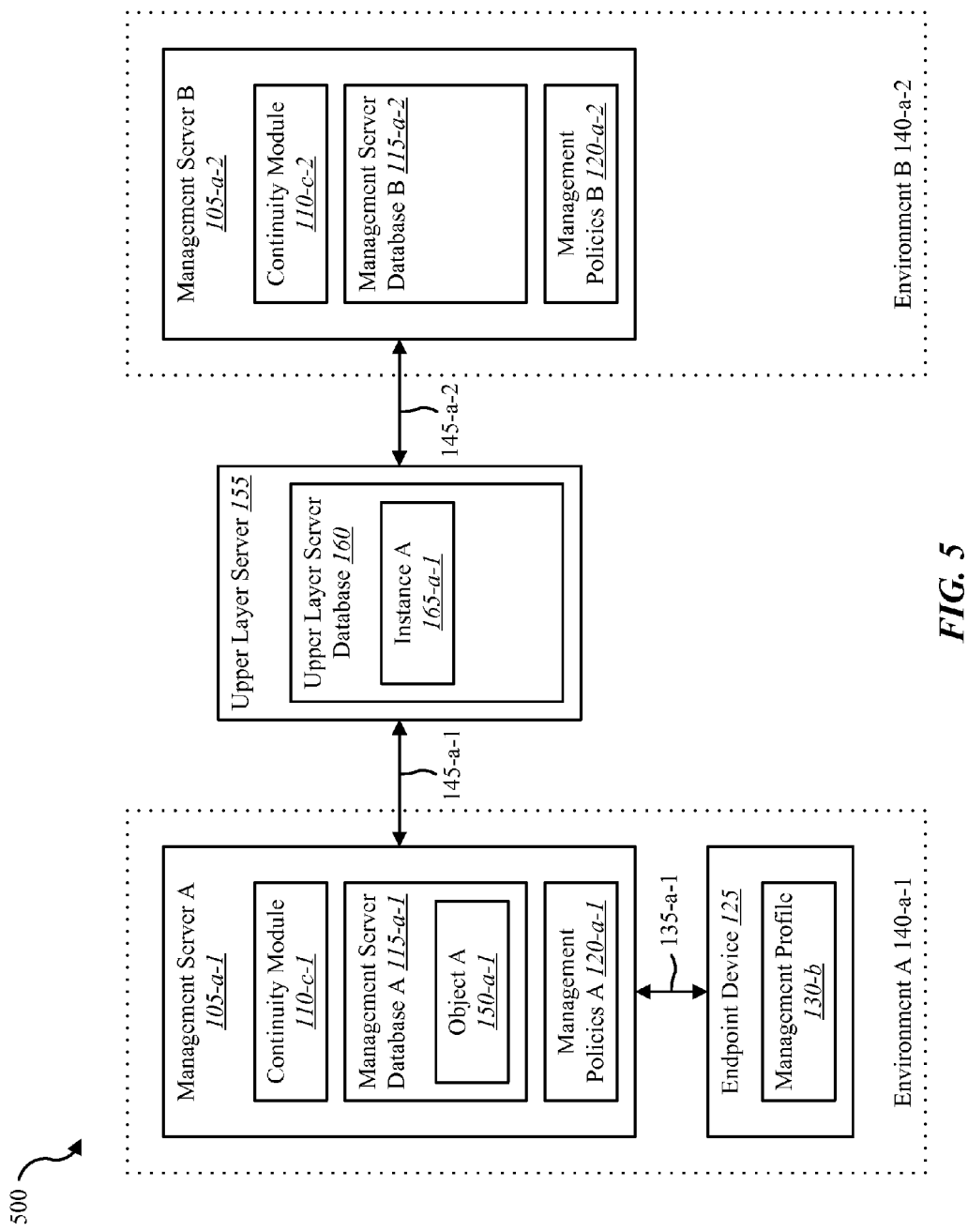
FIG. 5 illustrates an example of an endpoint device that is managed by management server A in environment A.

FIG. 5 illustrates an example of an endpoint device 125 that is managed by management server A 105-a-1 in environment A 140-a-1. Environment 500 may be similar to environment 100 illustrated in FIG. 1.

In this example, management server A 105-a-1 is in communication with the endpoint device 125 via connection 135-a-1. The endpoint device 125 includes a management profile 130-b. The management profile 130-b may be an example of the management profile 130 illustrated in FIG. 1 or 4. The management profile 130-b may have been generated while the endpoint device 125 was being managed in environment A 140-a-1 or may have been generated previous to the time that the endpoint device 125 began being managed in environment A 140-a-1.

Management server A 105-a-1 may include a continuity module 110-c-1, the management server database A 115-a-1, and the management policies A 120-a-1. The continuity module 110-c-1 may be an example of the continuity module 110 illustrated in FIG. 1 or 2. In this example, the continuity module 110-c-1 has added object A 150-a-1 to management server database A 115-a-1 and has provided (via connection 145-a-1, for example) information related to object A 150-a-1 to the upper layer server 155. Therefore, the upper layer server database 160 may include instance A 165-a-1 (to indicate an instance of the endpoint device 125, for example).

Management server B 105-b-2 may include a continuity module 110-c-2, management server database B 115-a-2, and management policies B 120-a-2. Since, in this example, environment B 140-a-2 does not include any endpoint devices (and has not managed any endpoint devices), management server database B 115-b-2 may not include any management objects.

Figure 6:
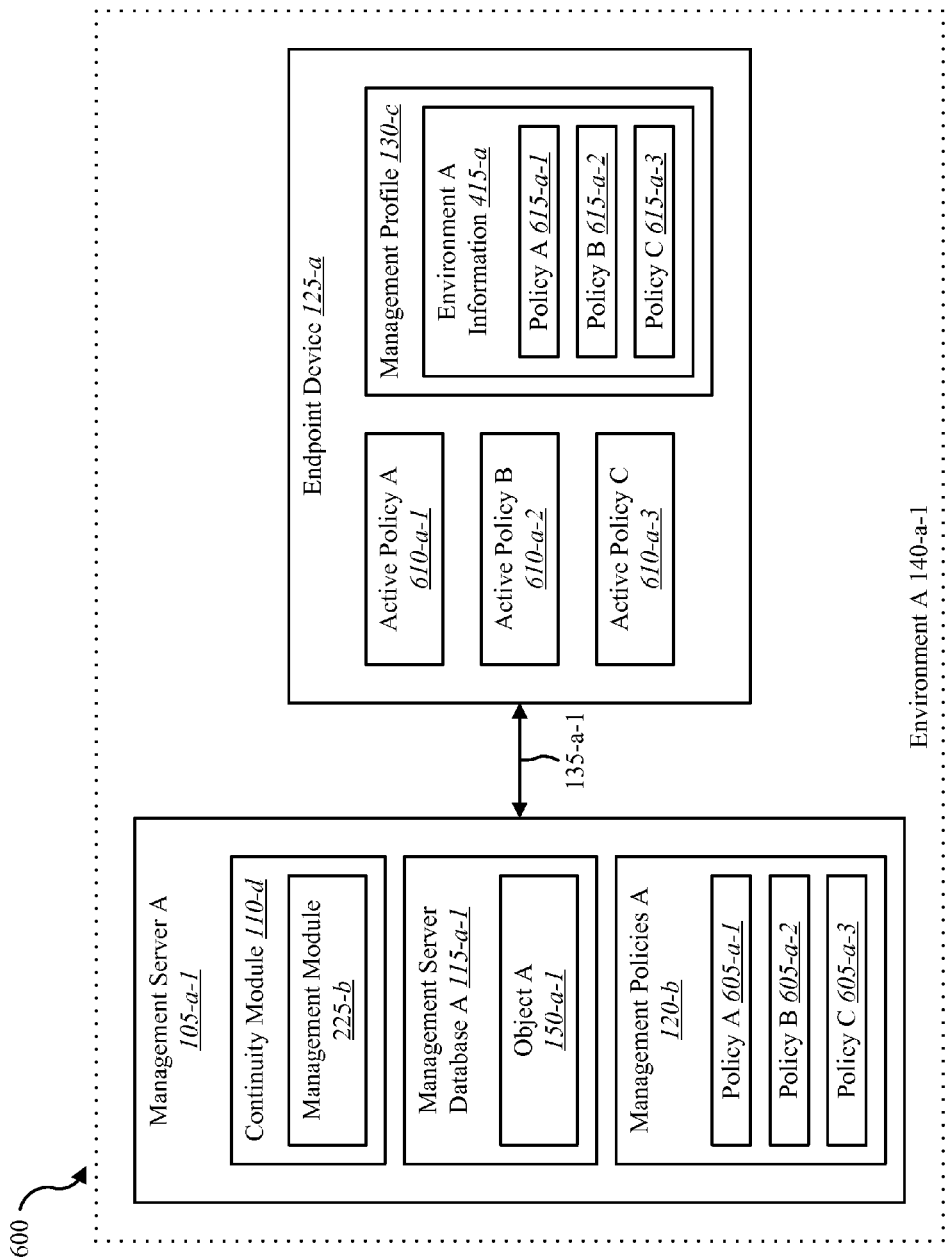
FIG. 6 is a block diagram illustrating one example of the endpoint device being managed by management server A.

FIG. 6 is a block diagram illustrating one example of the endpoint device 125-a being managed by management server A 105-a-1. Management server A 105-a-1 may be an example of management server A 105 illustrated in FIG. 1 or 5.

However, in this example, the continuity module 110-d includes a management module 225-b and management policies A 120-b include a set of management policies (e.g., policy A 605-a-1, policy B, 605-a-2, and policy C 605-a-3). The management module 225-b is an example of the management module 225 illustrated in FIG. 2 or 3. Management policies A 120-b is an example of management policies A 120 illustrated in FIG. 1 or 5. Management policies A 120-b-1 may require that policy A 605-a-1, policy B 605-a-2, and policy C 605-a-3 be applied to the endpoint device 125-a in order for the endpoint device 125-a to be compliant.

In this example, the management module 225-b may update the endpoint device 125-a by pushing or sending management data to the endpoint device 125-a. Once the management module 225-b has updated the endpoint device 125-a, the endpoint device 125-a may include active policy A 610-a-1, active policy B 610-a-2, and active policy C 610-a-3. In one example, active policies 610 may correspond to a collection of management data (e.g., updates, settings, permissions, and/or installed patches). Therefore, once the management data has been installed (updated) on the endpoint device 125-a, the management module 225-b may set a policy 610 (the management data associated with the policy 610, for example) to be in an active state (applied by the endpoint device 125-a) or in an inactive state (unapplied by the endpoint device 125-a).

The management module 225 may additionally update the management profile 130-c of the endpoint device 125-a. The management profile 130-c may be an example of the management profile 130 illustrated in FIG. 1, 4, or 5. In this example, the management profile may be updated to include environment A information 415-*a*. Environment A information may be an example of environment information 415 illustrated in FIG. 4. In one example, the environment A information 415-*a* may allow the endpoint device 125-*a* to be managed by a different management server while still recalling and being able to seamlessly transition to being managed in environment A 140-*a*-1 again (without having to reinstall management data, or wait to find out what policies should be applied in environment A 140-*a*-1). In one example, the management module 225-*b* may update the environment A information 415-*a* to include information for being managed in environment A 140-*a*-1, as well as indications (e.g., policy A 615-*a*-1, policy B 615-*a*-2, policy C 615-*a*-3) of the specific policies that should be active while in environment A 140-*a*-1.

Figure 7:
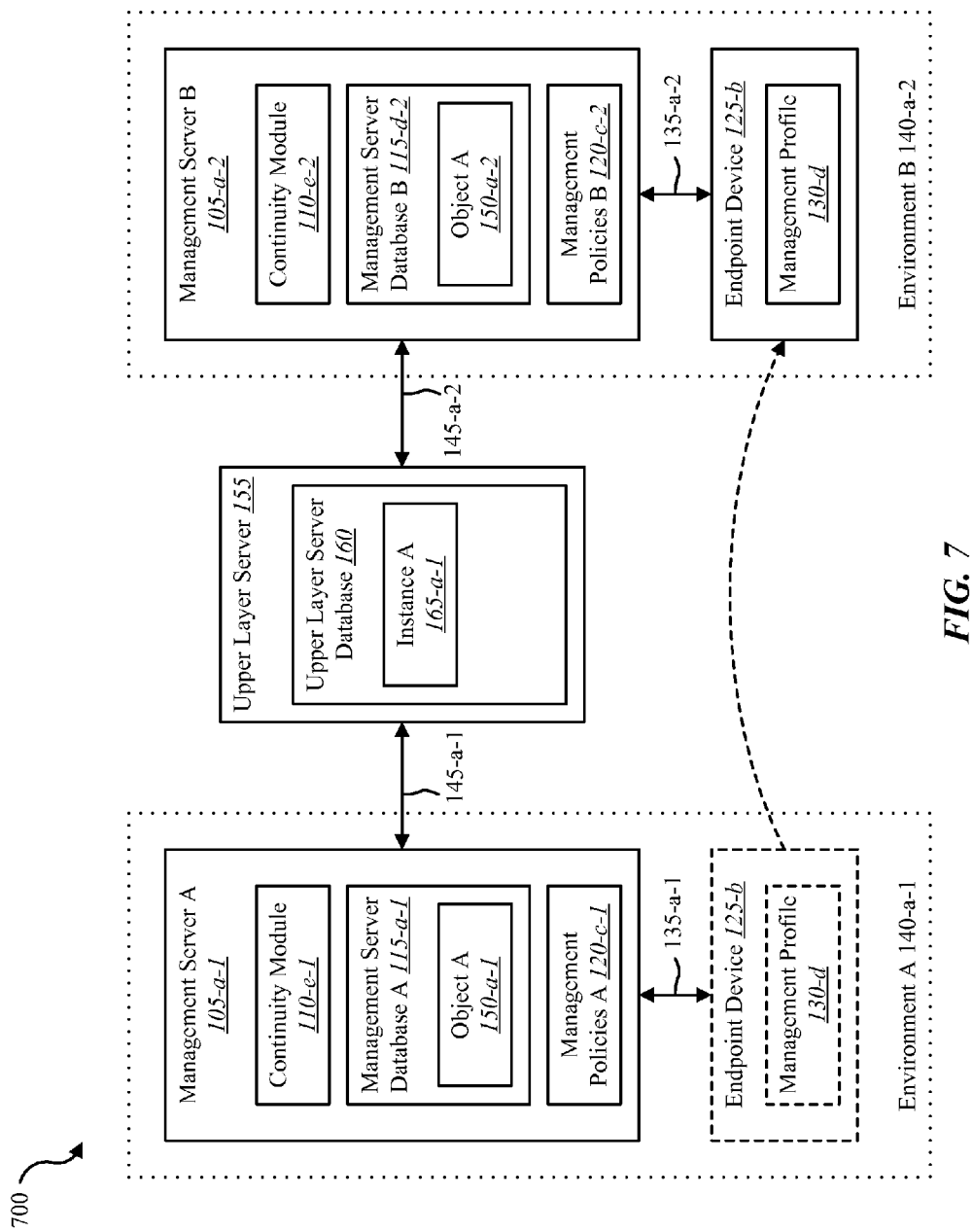
FIG. 7 illustrates an example of an endpoint device that is managed by management server B in environment B.

FIG. 7 illustrates an example of an endpoint device 125 that is managed by management server B 105-*a*-2 in environment B 140-*a*-2. Environment 700 may be similar to environments 100 and/or 500 illustrated in FIGS. 1 and 5, respectively.

In this example, the endpoint device 125-*b* has moved from environment A 140-*a*-1 to environment B 140-*a*-2. The endpoint device 125-*b* may include management profile 130-*d*. Endpoint device 125-*b* may be an example of endpoint device 125 illustrated in FIG. 1, 5, or 6. Management profile 130-*d* may be an example of management profile 130 illustrated in FIG. 1, 4, 5, or 6.

As a result of the endpoint device 125-*b* being managed in environment A 140-*a*-1, the management server database A 115-*a*-1 includes object A 150-*a*-1 and the upper layer server database 160 include instance A 165-*a*-1, as described previously.

In this example, management server B 105-*a*-2 is in communication with the endpoint device 125-*b* via connection 135-*a*-2. Management server B 105-*a*-2 may include a continuity module 110-*e*-2, management server database B 115-*a*-2, and management policies B 120-*c*-2. The continuity module 110-*e*-2 may be an example of the continuity module 110 illustrated in FIG. 1, 2, 5, or 6. In this example, the continuity module 110-*e*-2 has received the management profile 130-*d* from the endpoint device 125-*b* and has determined that the endpoint device 125-*b* has been managed by in a recognized environment (e.g., environment A 140-*a*-1). Therefore, the continuity module 110-*e*-2 has generated and stored object A 150-*a*-2, based on the management profile 130-*d*. In this example, object A 150-*a*-2 is another instance of object A 150-*a*-1. The continuity module 110-*e*-2 has provided information related to object A 150-*a*-2 to the upper layer server 155, but because the information related to object A 150-*a*-2 corresponds to information transmitted by continuity module 110-*e*-1 regarding object A 150-*a*-1, another instance may not be created in the upper layer server database 160. As a result, the single instance A 165-*a*-1 may be maintained.

Figure 8:
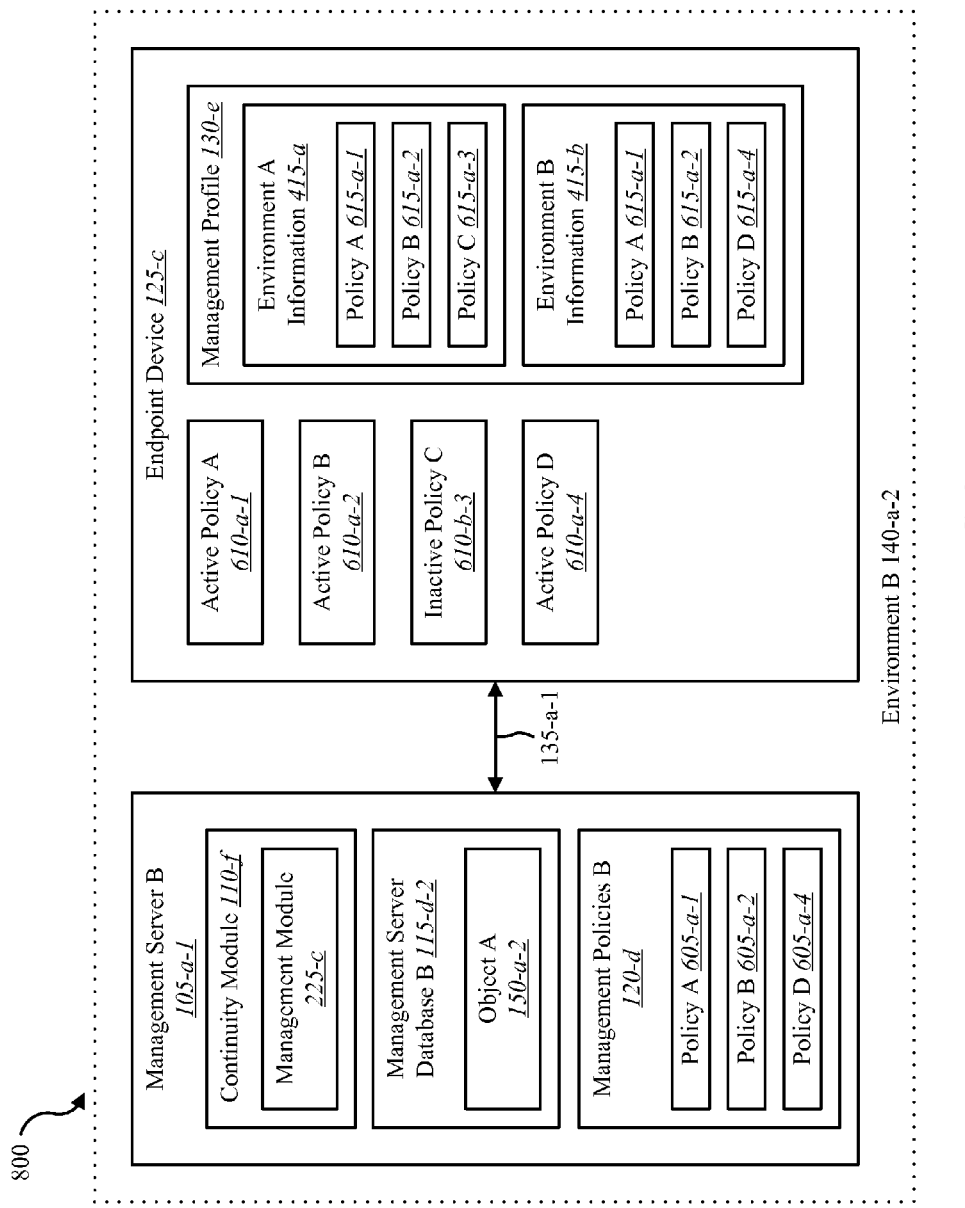
FIG. 8 is a block diagram illustrating one example of the endpoint device being managed by management server B.

FIG. 8 is a block diagram illustrating one example of the endpoint device 125-*c* being managed by management server B 105-*a*-1. Management server B 105-*a*-1 may be an example of management server B 105 illustrated in FIG. 1, 5, or 7.

However, in this example, the continuity module 110-*f* includes a management module 225-*c* and management policies B 120-*d* includes a set of management policies (e.g., policy A 605-*a*-1, policy B, 605-*a*-2, and policy D 605-*a*-4). The management module 225-*c* is an example of the management module 225 illustrated in FIG. 2, 3, or 6. Management policies B 120-*d* is an example of management policies B 120 illustrated in FIG. 1, 5 or 7. Management policies B 120-*d* may require that policy A 605-*a*-1, policy B 605-*a*-2, and policy D 605-*a*-4 be applied to the endpoint device 125-*c* in order for the endpoint device 125-*c* to be compliant.

In this example, the management module 225-*c* may compare the management policies B 120-*d* (e.g., policy A 605-*a*-1, policy B 605-*a*-2, policy D 605-*a*-4) with the information in the management profile 130-3. Since the environment A information 415-*a* includes indications (e.g., policy A 615-*a*-1, policy B 615-*a*-1) that policy A and policy B are already active on the endpoint device (because the endpoint's last management server was management server A in environment A and those are required policies), the only policy that endpoint device 125-*c* needs updating with is policy D 605-*a*-4. The management module 225-*c* may update the endpoint device 125-*c* by pushing or sending updates for policy D 605-*a*-4 to the endpoint device 125-*c*. Once the management module 225-*c* has updated the endpoint device 125-*c*, the endpoint device 125-*c* may include active policy D 610-*a*-4. The management module 225-*c* may allow previously active policy C 610-*a*-3 to remain active or direct the policy C to become inactive policy C 610-*b*-3 (as shown). As a result, following the updates by the management module 225-*c*, active policy A 610-*a*-1, active policy B 610-*a*-2, and active policy D 610-*a*-4 may be installed on the endpoint device 125-*c* which makes endpoint device 125-*c* compliant with the management policies B 120-*d* for environment B 140-*a*-2.

The management module 225-*c* may additionally update the management profile 130-*e* of the endpoint device 125-*c*. The management profile 130-*e* may be an example of the management profile 130 illustrated in FIG. 1, 4, 5, 6, or 7. In this example, the management profile 130-*e* may be updated to include environment B information 415-*b* in addition to the environment A information 415-*a*. Environment B information 415-*b* may be an example of environment information 415 illustrated in FIG. 4 or 6. In one example, the environment B information 415-*b* may allow the endpoint device 125-*c* to be managed by a different management server while still recalling and being able to seamlessly transition to being managed in environment B 140-*a*-2 again (without having to reinstall management data, or wait to find out what policies should be applied in environment B 140-*a*-2. In one example, the management module 225-*c* may update the environment B information 415-*b* to include information for being managed in environment B 140-*a*-2, as well as indications (e.g., policy A 615-*a*-1, policy B 615-*a*-2, policy D 615-*a*-4) of the specific policies that should be active while in environment B 140-*a*-2.

Figure 9:
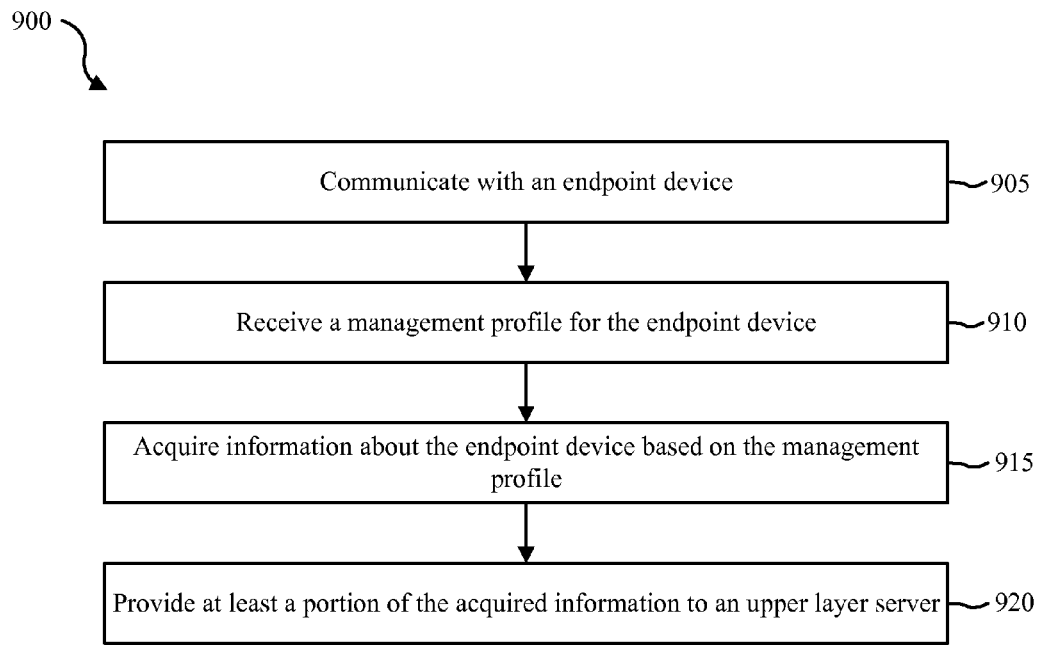
FIG. 9 is a flow diagram illustrating one embodiment of a method to manage a device across disconnected environments.

FIG. 9 is a flow diagram illustrating one embodiment of a method 900 to manage a device across disconnected environments. In one configuration, the method 900 may be implemented by a management server 105 such as management server 105 illustrated in FIG. 1, 5, 6, 7, or 8. In particular, the method 900 may be implemented by the continuity module 110 of FIG. 1, 2, 5, 6, 7, or 8.

At block 905, communications may occur with an endpoint device. At block 910, a management profile for the endpoint device may be received. At block 915, information about the endpoint device may be acquired based on the management profile. At block 920, at least a potion of the acquired information may be provided to an upper layer server.

Thus, the method 900 may allow for continuous management of endpoint devices across disconnected environments. It should be noted that the method 900 is just one implementation and that the operations of the method 900 may be rearranged or otherwise modified such that other implementations are possible.

Figure 10:
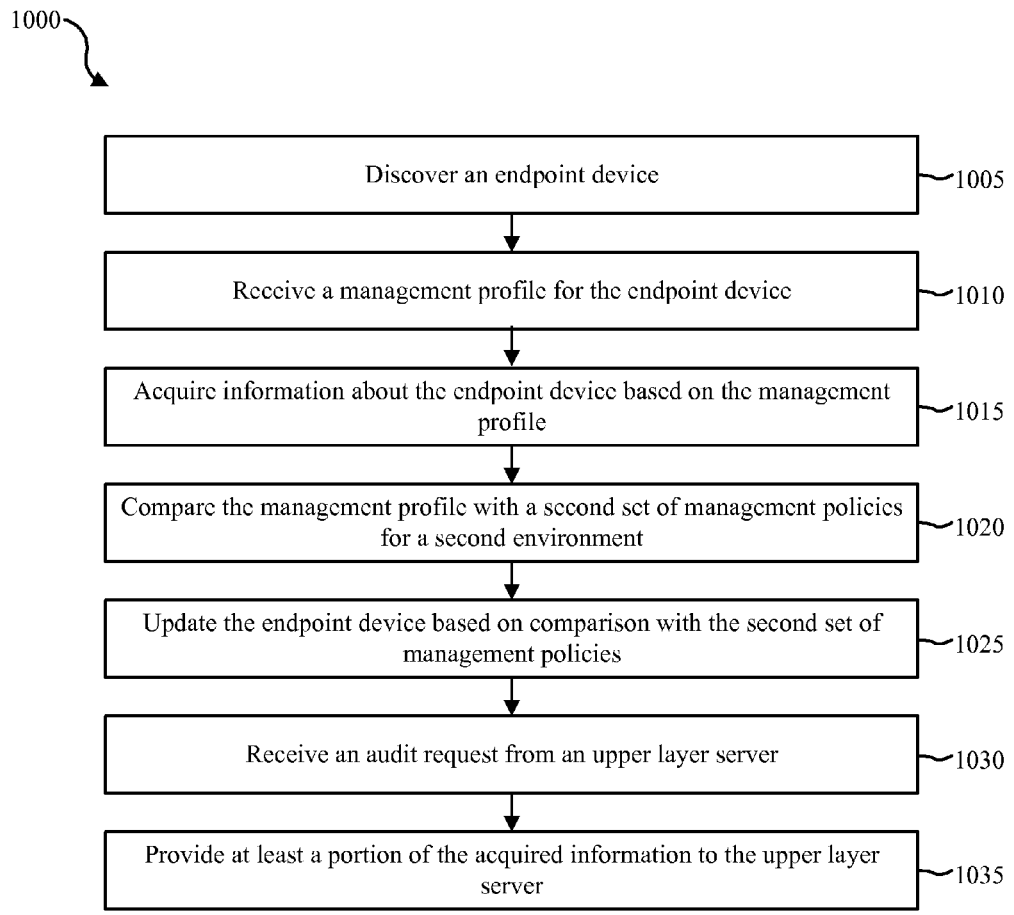
FIG. 10 is a flow diagram illustrating one embodiment of a method to manage a device across disconnected environments based on a management profile.

FIG. 10 is a flow diagram illustrating one embodiment of a method 1000 to manage a device across disconnected environments based on a management profile. In one configuration, the method 1000 may be implemented by a management server 105 such as management server 105 illustrated in FIG. 1, 5, 6, 7, or 8. In particular, the method 1000 may be implemented by the continuity module 110 of FIG. 1, 2, 5, 6, 7, or 8.

At block 1005, an endpoint device may be discovered. At block 1010, a management profile for the endpoint device may be received. At block 1015, information about the endpoint device may be acquired based on the management profile. At block 1020, the management profile may be compared with a second set of management policies for a second environment. At block 1025, the endpoint device may be updated based on the comparison with the second set of management policies. At block 1030, an audit request may be received from an upper layer server. For example, the upper layer server may request information that is related to a database of management objects on the management server. At block 1035, at least a portion of the acquired information may be provided to the upper layer server.

Thus, the method 1000 may allow for continuous management of endpoint devices across disconnected environments based on a management profile. It should be noted that the method 1000 is just one implementation and that the operations of the method 1000 may be rearranged or otherwise modified such that other implementations are possible.

Figure 11:
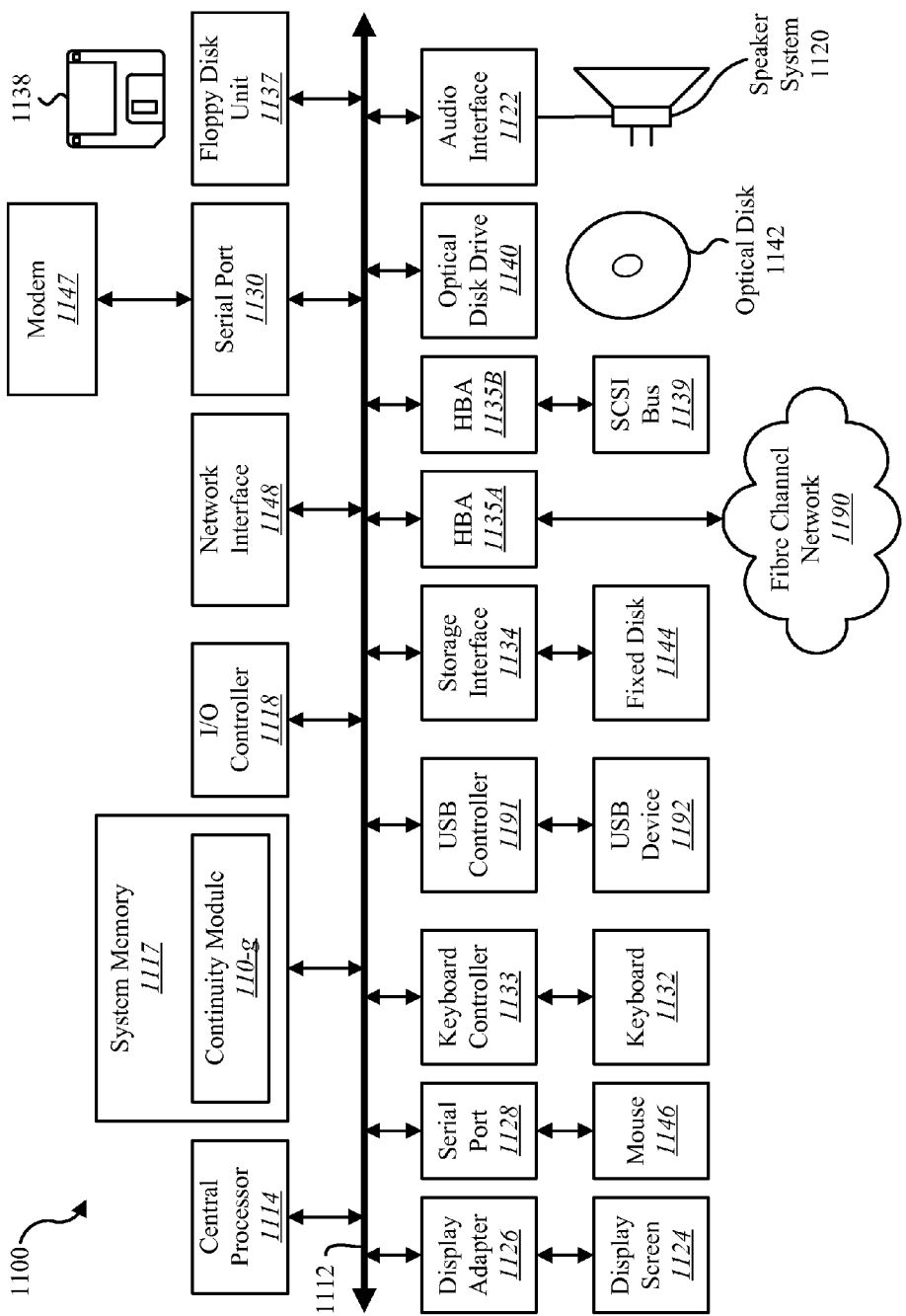
FIG. 11 depicts a block diagram of a computer system suitable for implementing the present systems and methods.

FIG. 11 depicts a block diagram of a computer system 1100 suitable for implementing the present systems and methods. Computer system 1100 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), multiple USB devices 1192 (interfaced with a USB controller 1191), a storage interface 1134, a floppy disk unit 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a continuity module 110-g to implement the present systems and methods may be stored within the system memory 1117. The continuity module 110-g may be an example of the continuity module 110 of FIG. 1, 2, 5, 6, 7, or 8. Applications resident with computer system 1100 are generally stored on and accessed via a non-transitory computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1100, can connect to a standard computer readable medium for storage and/or retrieval of information, such as a fixed disk drive 1144. Fixed disk drive 1144 may be a part of computer system 1100 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 11 need not be present to practice the present systems and methods. The devices and subsystems can be interconnected in different ways from that shown in FIG. 11. The operation of a computer system such as that shown in FIG. 11 is readily known in the art and is not discussed in detail in this application. Code to implement the present disclosure can be stored in a non-transitory computer-readable medium such as one or more of system memory 1117, fixed disk 1144, optical disk 1142, or floppy disk 1138. The operating system provided on computer system 1100 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 12:
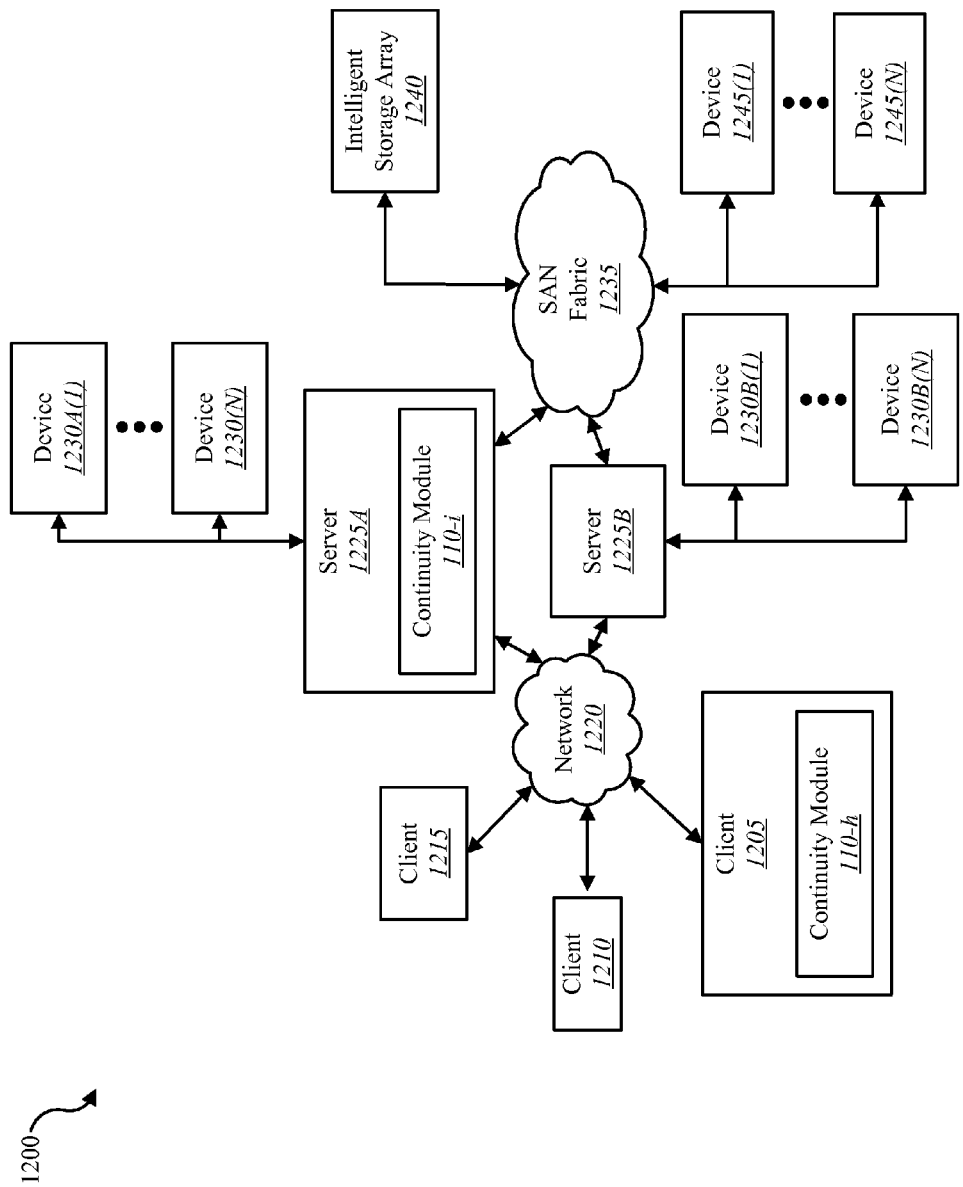
FIG. 12 is a block diagram depicting a network architecture in which client systems, as well as storage servers (any of which can be implemented using computer system), are coupled to a network.

FIG. 12 is a block diagram depicting a network architecture 1200 in which client systems 1205, 1210 and 1215, as well as storage servers 1225A, 1225B (any of which can be implemented using computer system 1000), are coupled to a network 1220. In one embodiment, a continuity module 110-*h*, 110-*i* may be located within the storage servers 1225A, 1225B and/or the client systems 1205, 1210, 1215 to implement the present systems and methods. The continuity modules 110-*h*, 110-*i* may be examples of the continuity module 110 of FIG. 1, 2, 5, 6, 7, or 8. The storage server 1225A is further depicted as having storage devices 1230A(1)-(N) directly attached, and storage server 1225B is depicted with storage devices 1230B(1)-(N) directly attached. SAN fabric 1235 supports access to storage devices 1245(1)-(N) by storage servers 1225A, 1225B, and so by client systems 1205, 1210, 1215 via network 1220. Intelligent storage array 1240 is also shown as an example of a specific storage device accessible via SAN fabric 1235.

With reference to computer system 1100, modem 1047, network interface 1148, or some other method can be used to provide connectivity from each of client computer systems 1205, 1210, and 1215 to network 1220. Client systems 1205, 1210, and 1215 are able to access information on storage server 1225A or 1225B using, for example, a web browser, or other client software (not shown). Such a client allows client systems 1205, 1210, and 1215 to access data hosted by storage server 1225A or 1225B or one of storage devices 1230A(1)-(N), 1230B(1)-(N), 1245(1)-(N) or intelligent storage array 1240. FIG. 12 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to manage an endpoint device, comprising:
    communicating, by a processor, with the endpoint device;
    receiving, by the processor, a management profile for the endpoint device, wherein the management profile for the endpoint device is generated in a first environment, wherein the first environment is managed by a first management server, the first environment having a first set of management policies;
    acquiring, by the processor, information about the endpoint device based at least in part on the management profile;
    providing, by the processor, at least a portion of the acquired information to an upper layer server;
    comparing the management profile with a second set of management policies for a second environment, wherein the second environment is managed by a second management server;
    updating the endpoint device based at least in part on the second set of management policies; and
    communicating with the endpoint device to update the management profile, wherein the updated management profile comprises first information related to the first set of management policies and second information related to the second set of management policies.

2. The method of claim 1, wherein the portion of the acquired information corresponds to endpoint device information that is provided to the upper layer server by the first management server.

3. The method of claim 2, wherein the portion of the acquired information identifies the endpoint device as the same endpoint device that is associated with the endpoint device information, without duplication of one or more of data, compliance level, and status information.

4. The method of claim 1, further comprising:
    managing the endpoint device based at least in part on the information about the endpoint device.

5. The method of claim 1, wherein updating the endpoint device comprises:
    pushing management data to the endpoint device, wherein the management data is at least one of a policy, a software update, a software patch, a software deployment package, an antivirus definition, a firmware update, or a system update.

6. The method of claim 1, wherein the first environment and the second environment are disconnected environments.

7. The method of claim 1, wherein the first information enables continuity of management with the first management server in the first environment, and wherein the second information enables continuity of management with the second management server in the second environment.

8. The method of claim 1, wherein the management profile uniquely identifies at least one of an identity of the endpoint device and a management posture of the endpoint device, wherein the management profile enables the endpoint device to be uniquely identified to the first management server and the second management server.

9. The method of claim 1, wherein the management profile is represented in a universal format that is usable by the first management server and the second management server.

10. The method of claim 7, wherein the first management server and the second management server use software from different vendors.

11. The method of claim 1, wherein the management profile comprises one or more of device information, security information, inventory information, current management state information, information related to current policies, information related to supported capabilities, and information related to a last applied set of management rules, and wherein the management profile is stored on the endpoint device.

12. A device configured to manage an endpoint device, comprising:
a processor; and
memory in electronic communication with the processor; and
instructions stored in the memory, the instructions being executable by the processor to:
communicate with the endpoint device;
receive a management profile for the endpoint device, wherein the management profile for the endpoint device is generated in a first environment, wherein the first environment is managed by a first management server, the first environment having a first set of management policies;
acquire information about the endpoint device based at least in part on the management profile; and
provide at least a portion of the acquired information to an upper layer server;
compare the management profile with a second set of management policies for a second environment, wherein the second environment is managed by a second management server;
update the endpoint device based at least in part on the second set of management policies; and
communicate with the endpoint device to update the management profile, wherein the updated management profile comprises first information related to the first set of management policies and second information related to the second set of management policies.

13. The device of claim 12, wherein the portion of the acquired information corresponds to endpoint device information that is provided to the upper layer server by the first management server.

14. The device of claim 12, wherein the portion of the acquired information identifies the endpoint device as the same endpoint device that is associated with the endpoint device information, without duplication of one or more of data, compliance level, and status information.

15. The device of claim 12, wherein the instructions are further executable to:
manage the endpoint device based at least in part on the information about the endpoint device.

16. A computer-program product to manage an endpoint device, the computer-program product comprising a non-transitory computer-readable medium having instructions thereon, the instructions being executable by a processor to:
communicate with the endpoint device;
receive a management profile for the endpoint device, wherein the management profile for the endpoint device is generated in a first environment, wherein the first environment is managed by a first management server, the first environment having a first set of management policies;
acquire information about the endpoint device based at least in part on the management profile; and
provide at least a portion of the acquired information to an upper layer server;
compare the management profile with a second set of management policies for a second environment, wherein the second environment is managed by a second management server;
update the endpoint device based at least in part on the second set of management policies; and
communicate with the endpoint device to update the management profile, wherein the updated management profile comprises first information related to the first set of management policies and second information related to the second set of management policies.

* * * * *